United States Patent
Zhou

(10) Patent No.: US 10,248,774 B2
(45) Date of Patent: Apr. 2, 2019

(54) METHOD FOR CONTROLLING UNLOCKING AND MOBILE TERMINAL

(71) Applicant: Guangdong Oppo Mobile Telecommunications Corp., Ltd., Dongguan, Guangdong (CN)

(72) Inventor: Yibao Zhou, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 85 days.

(21) Appl. No.: 15/589,243

(22) Filed: May 8, 2017

(65) Prior Publication Data
US 2017/0337363 A1 Nov. 23, 2017

(30) Foreign Application Priority Data
May 18, 2016 (CN) .......................... 2016 1 0331699

(51) Int. Cl.
*G06F 21/00* (2013.01)
*G06F 21/32* (2013.01)
*G06K 9/00* (2006.01)
*G06F 21/62* (2013.01)

(52) U.S. Cl.
CPC .......... *G06F 21/32* (2013.01); *G06F 21/6218* (2013.01); *G06K 9/0002* (2013.01); *G06K 9/00013* (2013.01); *G06K 9/00087* (2013.01); *G06K 9/00993* (2013.01)

(58) Field of Classification Search
None
See application file for complete search history.

(56) References Cited

U.S. PATENT DOCUMENTS

| 2010/0225607 | A1 | 9/2010 | Kim |
| 2012/0085822 | A1* | 4/2012 | Setlak .................. G06K 9/0002 235/439 |
| 2017/0286658 | A1* | 10/2017 | Zamfir .................... G06F 21/32 |
| 2018/0064402 | A1* | 3/2018 | Leydon ................ A61B 5/0026 |

FOREIGN PATENT DOCUMENTS

| CN | 1487462 | 4/2004 |
| CN | 201402464 Y | 2/2010 |
| CN | 102136046 A | 7/2011 |
| CN | 103744501 A | 4/2014 |

(Continued)

OTHER PUBLICATIONS

Khalil, Mohammed S.; Kurniawan, Fajri. A Review of Fingerprint Pre-Processing Using a Mobile Phone. 2012 International Conference on Wavelet Analysis and Pattern Recognition. https://ieeexplore.ieee.org/stamp/stamp.jsp?tp=&arnumber=6294770 (Year: 2012).*

(Continued)

*Primary Examiner* — Jeremiah L Avery
(74) *Attorney, Agent, or Firm* — Young Basile Hanlon & MacFarlane, P.C.

(57) ABSTRACT

A method for controlling unlocking includes: fingerprint data is received; a dominant frequency of a processor is increased; matching is conducted on the received fingerprint data based on the increased dominant frequency; the mobile terminal is unlocked when the received fingerprint data is matched.

16 Claims, 7 Drawing Sheets

(56) References Cited

FOREIGN PATENT DOCUMENTS

| CN | 103838353 A | 6/2014 |
|---|---|---|
| CN | 104007804 A | 8/2014 |
| CN | 105550640 A | 5/2016 |
| CN | 106022041 A | 10/2016 |

OTHER PUBLICATIONS

Ramya, T. et al. Personalized Authentication Procedure for Restricted Web Service Access in Mobile Phones. The Fifth International Conference on the Applications of Digital Information and Web Technologies (ICADIWT 2014). https://ieeexplore.ieee.org/stamp/stamp.jsp?tp=&arnumber=6814702 (Year: 2014).*

Liu, Yuxi; Hatzinakos, Dimitrios. Human Acoustic Fingerprints: A Novel Biometric Modality for Mobile Security. 2014 IEEE International Conference on Acoustics, Speech and Signal Processing (ICASSP). https://ieeexplore.ieee.org/stamp/stamp.jsp?tp=& arnumber=6854309 (Year: 2014).*

Davide Maltoni, Handbook of Fingerprint Recognition, 2nd ed, "Springer", Jan. 1, 2009, pp. 392-397.

Amir Rahmani, The Dark Side of Silicon: Energy Efficient Computing in the Dark Silicon Era, "Springer", Jan. 1, 2017, pp. 160-165.

Karim Yaghmour, Embedded Android. Porting, Extending and Customizing, "O'Reilly", Jan. 1, 2013, p. 101.

Kunio Uchiyama, Heterogeneous Multicore Processor Technologies for Embedded Systems, "Springer", Jan. 1, 2012, pp. 193-212.

Chong-Min Kyung, Energy-Aware System Design Algorithms and Architectures, "Springer", Jan. 1, 2011, pp. 6-7 and 11-12.

Sanjeeb Mishra, System on Chip Interfaces for Low Power Design, "Elsevier Morgan Kaufmann", Jan. 1, 2016, pp. 18-21.

Claudia Maienborn et al., Semantics an International Handbook of Natural Language Meaning, "De Gruyter Mouton", Jan. 1, 2011, p. 1485.

* cited by examiner

METHOD FOR CONTROLLING UNLOCKING AND MOBILE TERMINAL

CROSS-REFERENCE TO RELATED APPLICATION(S)

This application claims priority to Chinese Patent Application No. 201610331699.9, filed on May 18, 2016, the content of which is incorporated by reference herein in its entirety.

TECHNICAL FIELD

The present disclosure relates to the field of mobile terminals, and particularly to a method for controlling unlocking and a mobile terminal.

BACKGROUND

Fingerprints are patterns formed on finger pulps at tail ends of fingers of human beings by concave-convex skin. The fingerprints of the human beings are formed under the co-action of nature and nurture, and are closely related to human health. Therefore, everybody has fingerprints which are different. The repetition rate of the fingerprints is extremely low to about one over 15 billion, so the fingerprints are known as "body ID". On the basis of this feature of the fingerprints, fingerprints are widely used as information for identity authentication.

For example, fingerprint recognition technology has become a standard configuration for products of mainstream mobile terminal manufacturers. A fingerprint recognition process can be divided into feature extraction, data storage, and image matching. After an original fingerprint image of a human fingerprint is read by a fingerprint recognition sensor, feature point matching is performed between the fingerprint image and pre-stored registration fingerprint template, and the terminal will be unlocked when the fingerprint image and pre-stored registration fingerprint template are matched.

Unlocking speed directly affects the efficiency of use of a mobile terminal user. At present, the unlocking speed has become a competitive factor of each manufacturer. How to shorten unlocking time so as to improve the unlocking efficiency has become an important research direction of a person skilled in the art.

BRIEF DESCRIPTION OF THE DRAWINGS

In order to illustrate technical solutions of the implementations of the present disclosure more clearly, the drawings used in the description of the implementations will be briefly described, it will be apparent that the drawings described in the following are implementations of the present disclosure, and it will be apparent to those skilled in the art that other drawings can be obtained from the drawings without any creative work.

DETAILED DESCRIPTION

Figure 1:
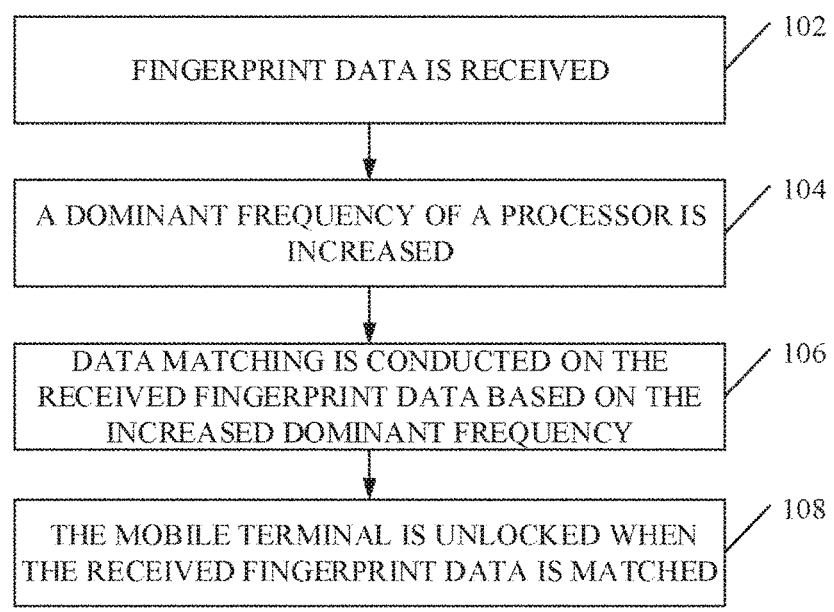
FIG. 1 is a schematic flow diagram illustrating a method for controlling unlocking according to an implementation of the present disclosure.

In order to make a person skilled in the art better understand the technical solutions of the present disclosure, the technical solutions in the implementations of the present disclosure will be described below clearly and completely in conjunction with the accompanying drawings in the implementations of the present disclosure. Obviously, the described implementations are some implementations of the present disclosure, not all of the implementations. On the basis of the implementations in the present disclosure, all other implementations obtained by a person skilled in the art without creative work should fall within the scope of protection of the present disclosure.

Terms "first", "second" and the like in the description, claims, and drawings of the present disclosure are used for distinguishing different objects rather than describing a specific order. In addition, terms "including" and "having" and any variations thereof are intended to cover non-exclusive inclusions. For example, processes, methods, systems, products, or devices containing a series of operations or units are not limitative to listed operations or units, other operations or units which are not listed are alternatively included, or other operations or units inherent to these processes, methods, products, or devices are further alternatively included instead.

"Implementation" or "implementation" involved herein means that specific features, structures or characteristics described in conjunction with implementations may be contained in at least one implementation of the present disclosure. The phrase appearing at each location in the description may not refer to the same implementation or may not be an independent or alternative implementation mutually exclusive from other implementations. A person skilled in the art should explicitly and implicitly understand that the implementations described herein may be combined with other implementations.

In the following, some of the terms used herein are explained to facilitate the understanding for those skilled in the art.

Terminal

Terminal, also known as terminal device, terminal equipment or user equipment (UE), means a device that provides voice and/or data connectivity to a user, examples of which includes hand-held devices with wireless connectivity function, on-board devices and the like. Common terminals include, for example, mobile phones, tablets, laptops, hand-held computers, mobile internet devices (MID), and wearable equipment such as smart watches, smart bracelets, and pedometers and so on.

Fingerprint Recognition Sensor

A fingerprint recognition sensor, also known as a fingerprint recognition module or fingerprint sensor, can realize the recognition of individual fingerprint features through a specific induction sensor. At present, the fingerprint recognition sensor is mainly divided into an optical fingerprint sensor, a capacitive fingerprint sensor, and a radio frequency (RF) fingerprint sensor. The fingerprint recognition sensor can be set in combination with a metal dome array (in other words, dome key) of a terminal, and can be set on the front surface, the race surface, or the side surface of the terminal, the present disclosure is not limited thereto. Similarly, the fingerprint recognition sensor can be set in combination with the touch screen of the terminal. For example, the fingerprint recognition sensor can be set below the touch panel of the touch screen.

Feature

Feature or characteristic refers to fingerprint features of a fingerprint image or a fingerprint recognition sensor; the fingerprint feature includes overall features and local features. The overall features in turn include basic pattern patterns such as loop, arch, and whorl. The local features, also known as minutiae, node, or feature point, generally refer to an individual portion of the fingerprint or information representative thereof. Two fingerprints often have the same overall features, however, their local features, that is, the minutiae, cannot be exactly the same. Prints of a fingerprint are not continuous, smooth, or straight, but often break, bifurcated, or curved. These break points, bifurcation points, and turning points are called "minutiae", which can provide confirmation information of the uniqueness of a fingerprint. Minutiae on a fingerprint have the following four different properties. 1) ending, means an end of a print; 2) Bifurcation, means the splitting of a print into two or more than two prints; 3) ridge divergence, means the separating of two parallel prints; 4) dot or island, means a particularly short print that become a little dot; 5) enclosure, means a small ring formed when a print separated into two prints and these two prints immediately merged into one. Fingerprint feature data includes the follows: 1) short Ridge, means a print which is short but not so short to be a little dot; 2) orientation, means that a minutiae point can toward a certain direction; 3) curvature, describes the speed at which the orientation of a print changes; 4) position, which is described via (x, y) coordinates, can be absolute, or can be inductively recognized relative to triangular points or minutiae.

Fingerprint Template

Figure 7:
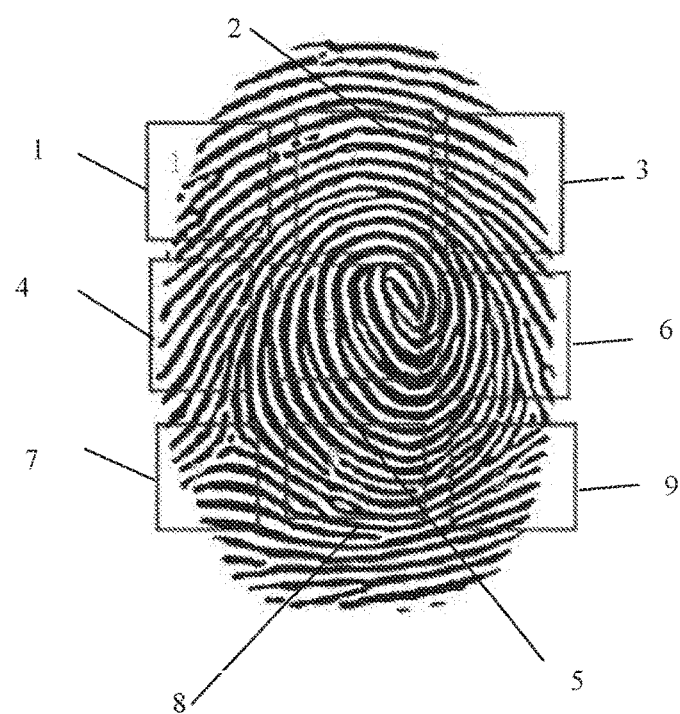
FIG. 7 is a schematic diagram illustrating an example of a fingerprint template.

The term "fingerprint template" and variants thereof, generally refers to a substantially complete fingerprint, or information representative thereof, collected from one or more nodes of a finger. For example, when a fingerprint function of a terminal such as a mobile phone is enabled for the first time, the user may be asked to undergo a fingerprint registration process; during the fingerprint registration, the user put his or her finger on a fingerprint sensor for fingerprint image acquisition or receiving by the fingerprint sensor, and the fingerprint image received will be stored as a fingerprint template, usually, one finger corresponds to one fingerprint template; generally, the fingerprint sensor may receive 10-20 times for each finger in order to receive the whole fingerprint face and generate a comprehensive fingerprint template. Feature information can be obtained from the fingerprint image received, and for example, the fingerprint template can be saved in the form of image. FIG. 7 illustrates an exemplary fingerprint template, and the numbers marked in the fingerprint of FIG. 7 refers to minutiae.

Fingerprint Image

Fingerprint image generally refers to images collected or received by the fingerprint recognition sensor; fingerprint image data, fingerprint image information, fingerprint data, or fingerprint information generally refers to information or data of the fingerprint image, and can be stored locally in the terminal such as stored in a database or memory built into the terminal. When we refer to receiving or collecting fingerprint image, this can be understood as receiving fingerprint image information or fingerprint image data.

In the following, when it mentions that the terminal or the fingerprint recognition sensor receives a fingerprint images or fingerprint information or fingerprint data, it means the terminal or the fingerprint sensor may get, acquire, obtain or collect the fingerprint image or fingerprint information or fingerprint data. The terms used above can be interchanged without causing ambiguous.

Implementations of the present disclosure will be introduced in detail below.

According to an implementation of the present disclosure, there is provided a method for controlling unlocking, in which a fingerprint data is received, and a dominant frequency of a processor (that is, a processor for handling fingerprint comparison/matching) is increased; a matching process is performed on the received fingerprint data, and the terminal will be unlocked when the received fingerprint data is matched.

Referring to FIG. 1, FIG. 1 is a schematic flow diagram illustrating a method for controlling unlocking according to an implementation of the present disclosure. The method can be implemented by a mobile terminal. As illustrated in FIG. 1, the method can begin at block 102.

At block 102, fingerprint data is received.

In at least one implementation, a mobile terminal can receive the fingerprint data. Specifically, the mobile terminal may have a fingerprint recognition sensor disposed on the front of the mobile terminal which includes a touch display; or the fingerprint recognition sensor can be disposed on the back of the mobile terminal. In at least one implementation, the mobile terminal can begin to detect a touch operation on the fingerprint recognition sensor thereof when the mobile terminal is in a lock-screen state; or, the mobile terminal can detect the touch operation of the fingerprint recognition sensor after the detection of an open operation of a certain application or a certain file, thereby determining whether or not to open the application or the file based on the received fingerprint data.

The fingerprint recognition sensor has a sensing electrode array including n1 abnormal sensing electrodes and n2 normal sensing electrodes, n1 and n2 are positive integers. In at least one implementation, the received fingerprint data can include n2 underlying data values obtained via n2 normal sensing electrodes of the fingerprint recognition sensor. The n2 underlying data values are used as the fingerprint data. n1 reference underlying data values corresponding to the n1 abnormal sensing electrodes can be determined based on the n2 underlying data values obtained in the manner described above. A fingerprint image can be generated according to the n2 underlying data values and the n1 reference underlying data values, thereby improving the efficiency of fingerprint image generation.

At block 104, a dominant frequency of a processor is increased.

In at least one implementation, after the fingerprint data is received, the dominant frequency of the processor configured for fingerprint data matching of the mobile terminal can be increased. The dominant frequency of the processor can be a current dominant frequency of the processor after receiving the fingerprint data, or can be an average dominant frequency when the processor works, and the present disclosure is not limited thereto. The mobile terminal can be integrated with a plurality of processors. For processors that do not handle fingerprint related instructions, the mobile terminal can reduce the dominant frequency of these processors appropriately, so as to reduce energy consumption of the mobile terminal.

Generally, the dominant frequency can be increased based on the highest dominant frequency of the processor. For example, when the dominant frequency is not the highest dominant frequency, it can be increased to the highest dominant frequency; in addition, when the dominant frequency is the highest dominant frequency, the dominant frequency of the processor can be adjusted to an over-lock mode.

In at least one implementation, the dominant frequency of the processor configured for fingerprint matching can be increased according to the current running status thereof (such as the utilization rate); or an amount of calculation of fingerprint matching to be conducted may be determined in advance, the dominant frequency of the processor configured for fingerprint matching can be increased appropriately according to the amount of calculation; or the dominant frequency of the processor configured for fingerprint matching can be increased to the highest dominant frequency, so as to obtain the maximal calculation efficiency. In the implementation of the present disclosure, the mobile terminal can determine a dominant frequency increment according to other parameters, and the present disclosure is not limited thereto.

At block 106, based on the increased dominant frequency, matching the received fingerprint data.

In at least one implementation, based on the increased dominant frequency, a data matching process can be conducted on the received fingerprint data. Specifically, after the dominant frequency of the processor configured to match fingerprint data is increased, the processor can improve the efficiency of data matching, reduce the time required for data matching; therefore, unlocking time of the terminal can be shortened. For example, a working dominant frequency of the processor is 1 GHz before the dominant frequency of the processor is increased, the working dominant frequency of the processor is 2 GHz after the dominant frequency of the processor is increased, then the time required to handle data matching instructions by the processor is reduced by half, and therefore, data matching is accelerated. When the working dominant frequency of the processor is 1 GHz, the time required to handle the data matching instructions is 100 ms, then when the working dominant frequency of the processor is increased to 2 GHz, the time required to handle the data matching instructions can be reduced up to 50 ms.

In at least one implementation, the received fingerprint data is compared with pre-stored fingerprint template data. Fingerprint data matching may be conducted as follows: feature points of the fingerprint image generated as described above at block 102 are extracted; the extracted feature points are compared with feature points of pre-stored fingerprint template. By means of the fingerprint matching in the manner described above, the fingerprint matching speed can be improved.

At block 108, the mobile terminal is unlocked when the received data is matched.

In at least one implementation, after data matching is conducted between the obtained fingerprint data and the pre-stored fingerprint template data, when the obtained fingerprint data is matched with the pre-stored fingerprint template data, the mobile terminal can be unlocked.

For instance, at block 106, the extracted feature points are compared with feature points of pre-stored fingerprint template to obtain a similarity score, in other words, a similarity score of the fingerprint image, and mobile terminal can be unlocked based on the similarity score. For example, when the similarity score is greater than a preset threshold, fingerprint matching is deemed as successful, and the mobile terminal will be unlocked.

Specifically, when the mobile terminal is currently in an interface lock-screen state, the interface of the mobile terminal can be unlocked. The interface referred to herein can include a desktop of the terminal, a main lock-screen interface, an application lock-screen interface, a file lock-screen interface and so on. When the mobile terminal needs to open an application or a file, the mobile terminal can unlock the corresponding application or file, so as to access the application or open the file.

In implementations of the present disclosure, after fingerprint data is obtained and before data matching is conducted, the dominant frequency of a processor of a mobile terminal can be increased, thereby improving the efficiency of data matching of the processor and reducing the time required for data matching between the obtained fingerprint data and pre-stored fingerprint template data, therefore, the fingerprint unlocking speed can be increased and user experience can be improved.

Figure 2:
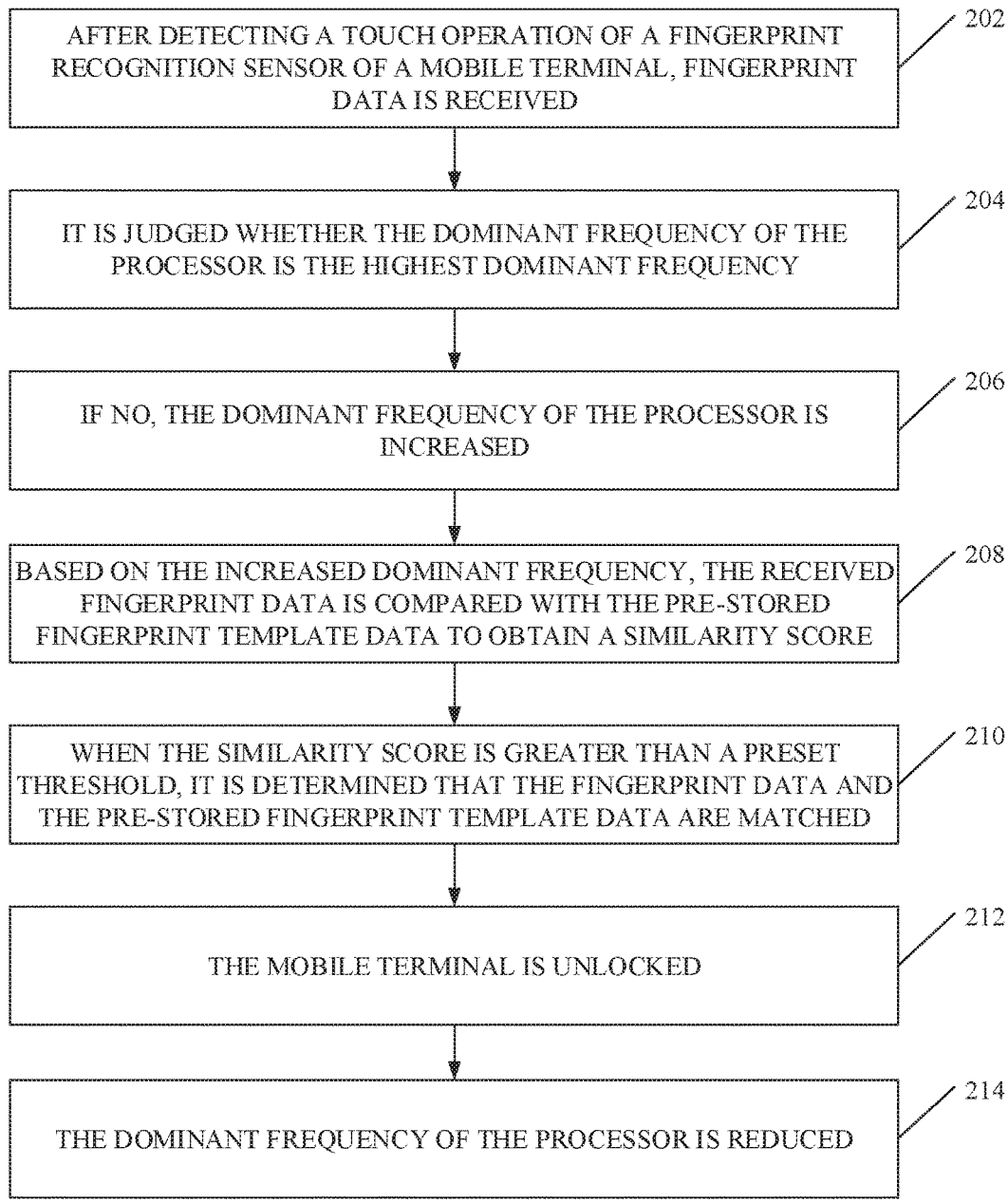
FIG. 2 is a schematic flow diagram illustrating another method for controlling unlocking according to an implementation of the present disclosure.

Referring to FIG. 2, FIG. 2 is a flow chart diagram illustrating another method for controlling unlocking according to an implementation of the present disclosure. The method can be implemented by a mobile terminal. As illustrated in FIG. 2, the method can begin at block 202.

At block 202, after detecting a touch operation on a fingerprint recognition sensor of a mobile terminal, fingerprint data is received.

In at least one implementation, after a touch operation on the fingerprint recognition sensor is detected, the mobile terminal can receive the fingerprint data. Specifically, the fingerprint recognition sensor of the mobile terminal can be disposed on the front of the mobile terminal which includes a touch display; or the fingerprint recognition sensor can be disposed on the back of the mobile terminal. In at least one implementation, the mobile terminal can begin to detect a touch operation on the fingerprint recognition sensor thereof when the mobile terminal is in a lock-screen state; or the mobile terminal can detect the touch operation of the fingerprint recognition sensor after a detection of an open operation of a certain application or a certain file, thereby determining whether or not to open the application or the file based on the obtained fingerprint data. In at least one implementation, the fingerprint recognition sensor has a sensing electrode array including n1 abnormal sensing electrodes and n2 normal sensing electrodes, n1 and n2 are positive integers. n2 underlying data values can be obtained via the n2 normal sensing electrodes, and the n2 underlying data values are used as the fingerprint data. n1 reference underlying data values corresponding to the n1 abnormal sensing electrodes can be determined based on the n2 underlying data values obtained in the manner describe above. A fingerprint image can be generated according to the n2 underlying data values and the n1 reference underlying data values, thereby improving the efficiency of fingerprint image generation. In other implementations of the present disclosure, fingerprint data can be obtained in other manners, and the present disclosure is not limited thereto.

At block 204, it is judged whether or not the dominant frequency of a processor is the highest dominant frequency. One mobile terminal may have a plurality of processors, the processor referred to at block 204 as well as the processor referred to at block 214 is the processor configured for fingerprint matching and/or fingerprint matching related operations, that is, the processor configured for handling fingerprint matching instructions.

In at least one implementation, after the fingerprint data is received, the mobile terminal may judge whether or not the working dominant frequency of the processor configured to match fingerprint data of the mobile terminal is the highest dominant frequency. For instance, the highest dominant frequency of the processor is 2 GHz. The terminal may judge whether or not the current working dominant frequency of the processor or an average working dominant frequency thereof during a certain time period maintains at the highest dominant frequency. If the dominant frequency is the highest dominant frequency, based on other parameters of the mobile terminal such as a work adaptive temperature of a chip, an over-clock adjustment may be performed appropriately on the dominant frequency of the processor. For example, the dominant frequency of the processor can be adjusted to 2.1 GHz, so as to further improve the operating efficiency of the processor in a state where the current mobile terminal can accommodate. When the dominant frequency of the processor is the highest dominant frequency in the current time or during a certain time period, the operating efficiency of the processor can be improved in other manners, and the present disclosure is not limited thereto. When the dominant frequency of the processor is not the highest dominant frequency, the dominant frequency of the processor may be increased in the following manners.

At block 206, the dominant frequency of the processor is not the highest dominant frequency, and the dominant frequency of the processor is increased.

In at least one implementation, when the dominant frequency of the processor configured to match fingerprint data is not the highest dominant frequency, the dominant frequency of the processor can be increased in any of the following manners.

(1) The dominant frequency of the processor is increased to the highest dominant frequency of the processor.

For example, suppose the working dominant frequency of the processor is 1 GHz before the dominant frequency of the processor is increased, when the dominant frequency of the processor is increased to the highest dominant frequency (2 GHz), the time required to process data matching instructions by the processor is reduced by half, therefore, data matching is accelerated. Suppose the working dominant frequency of the processor is 1 GHz and the time required for handling the data matching instructions is 100 ms, when the working dominant frequency of the processor is increased to 2 GHz, the time required for handling the data matching instructions by the processor can be reduced up to 50 ms.

(2) A dominant frequency increment of the processor can be determined based on an amount of calculation of matching between the obtained fingerprint data and the pre-stored fingerprint template data.

As one implementation, the amount of calculation of matching between the obtained fingerprint data and the pre-stored fingerprint template data is determined. A dominant frequency increment of the processor is determined based on the amount of calculation of matching. The dominant frequency increment is positively correlated with the amount of calculation of matching. The dominant frequency of the processor can be increased based on the dominant frequency increment.

For example, a data amount of the obtained fingerprint data is determined, this data amount includes but not limited to an effective data amount of the fingerprint data after feature points are extracted or an overall data amount obtained from the fingerprint. A data amount of the pre-stored fingerprint template data is obtained. The amount of calculation of matching is estimated based on the data amount of the obtained fingerprint data and the data amount of the pre-stored fingerprint template data. For example, the number of feature points that can be extracted from the fingerprint data is P, and the number of pre-stored feature points of the pre-stored fingerprint template data is n*Q, where n, P, and Q are positive integers. n refers to the number of fingerprint templates, Q refers to the number of feature points pre-stored in each fingerprint template. The P feature points in the obtained fingerprint data need to be compared with n*Q pre-stored feature points one by one and the amount of calculation of matching may be determined according to this calculation. The amount of calculation of matching can be determined in other manners. After the amount of calculation of matching is determined, the dominant frequency increment can be determined based on the amount of calculation of matching, and the increment can be increased in multiples, or may be a specific value to be increased. The larger the amount of calculation of matching, the greater the dominant frequency increment.

In at least one implementation, a correspondence chart between the amount of calculation of matching and the dominant frequency increment can be determined. For example, when the determined amount of calculation of matching is in a range from ten thousand times to one hundred thousand times, the corresponding dominant frequency increment means that the dominant frequency is increased by 1.1 times or increased by 500 MHz; when the amount of calculation of matching is in a range from one hundred thousand times to a million times, the corresponding dominant frequency increment means that the dominant frequency is increased by 1.2 times or increased by 700 MHz; The above-mentioned data is illustrated by way of example only, implementations of the present disclosure is not limited thereto.

(3) In addition to the amount of calculation of matching, a utilization rate of the processor can be determined either, and the dominant frequency increment can be determined by considering both the determined amount of calculation of matching and the utilization rate of the processor.

In one implementation, the amount of calculation of matching between the obtained fingerprint data and the pre-stored fingerprint template data is determined; the utilization rate of the processor is determined; the dominant frequency increment of the processor is determined based on the amount of calculation of matching and the utilization rate of the processor; the dominant frequency of the processor can be increased based on the determined dominant frequency increment.

For instance, when the determined amount of calculation of matching is high and the utilization rate of the processor is low, then the determined dominant frequency increment can be the highest. In at least one implementation, a correspondence chart among the amount of calculation of matching, the utilization rate of the processor, and the dominant frequency increment can be determined. Based on the correspondence chart, the corresponding dominant frequency increment can be determined based on the determined amount of calculation of matching and the utilization rate of the processor, the current dominant frequency can be increased based on the determined dominant frequency increment. For example, the dominant frequency increment value can be a specific value, or the dominant frequency increment value can be a specific multiple that the current dominant frequency will be multiplied.

At block 208, based on the increased dominant frequency, the received fingerprint data is compared with the pre-stored fingerprint template data, so as to obtain a similarity score.

At block 210, when the similarity score is greater than a preset threshold, it is determined that the fingerprint data and the pre-stored fingerprint template data are matched.

In at least one implementation, after the dominant frequency of the processor configured for fingerprint data matching is increased, the efficiency of matching between the obtained fingerprint data and the pre-stored fingerprint template data can be improved, so as to obtain the similarity score. The similarity score can be used to represent a matching result. In at least one implementation, the fingerprint data may be obtained in the following manner: The fingerprint recognition sensor has a sensing electrode array including n1 abnormal sensing electrodes and n2 normal sensing electrodes, n1 and n2 are positive integers. n2 underlying data values are obtained via the n2 normal sensing electrodes, and the n2 underlying data values are used as the fingerprint data. n1 reference underlying data values corresponding to the n1 abnormal sensing electrodes can be determined based on the n2 underlying data values obtained in the manner described above. A fingerprint image can be generated according to the n2 underlying data values and the n1 reference underlying data values. The fingerprint data matching can be implemented as follows: feature points of the fingerprint image are extracted; the extracted feature points are compared with pre-stored fingerprint template, so as to obtain a similarity score of the fingerprint image. When the similarity score is greater than a preset threshold, it can be determined that the fingerprint data matches with the pre-stored fingerprint template, and fingerprint matching is successful. By means of fingerprint matching performed in the manner described above, the fingerprint matching speed can be improved.

At block 212, the mobile terminal is unlocked.

In at least one implementation, the mobile terminal can be unlocked when the obtained fingerprint data and the pre-stored fingerprint template data are matched. Specifically, when the mobile terminal is currently in an interface lock-screen state, the interface of the mobile terminal can be unlocked. The interface referred to herein includes but not limited to a desktop of the terminal, a main lock-screen interface, an application lock-screen interface, a file lock-screen interface and so on. When the mobile terminal needs to open an application or a file, the mobile terminal can unlock the corresponding application or the file, so as to access the application or open the file.

At block 214, the dominant frequency of the processor (that is, the processor mentioned above at block 204) is reduced.

In at least one implementation, when the data matching is successful and the mobile terminal is unlocked, the dominant frequency of the processor can be reduced appropriately so as to reduce energy consumption of the mobile terminal. Specifically, the dominant frequency of the processor can be reduced to the dominant frequency before increasing, or the dominant frequency of the processor can be adjusted according to the current utilization rate of the processor.

In implementations of the present disclosure, the dominant frequency of the processor of the mobile terminal can be increased after the fingerprint data is received and before fingerprint data matching is conducted, thereby the efficiency of data matching of the processor can be increased and the time required for data matching between the obtained fingerprint data and pre-stored fingerprint template data can be reduced, therefore, the fingerprint unlocking speed can be improved and user experience is enhanced.

Figure 3:
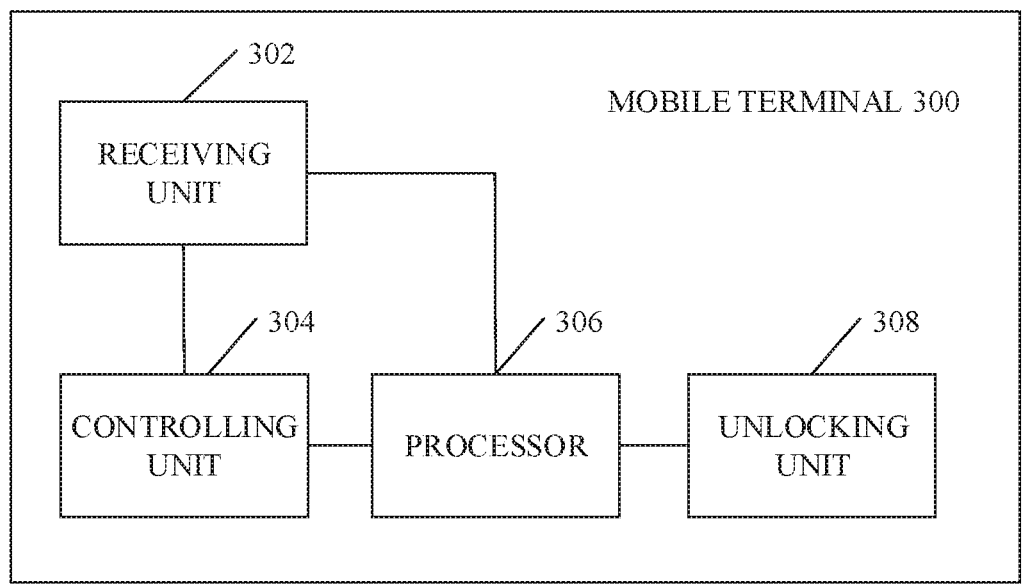
FIG. 3 is a structural block diagram illustrating a mobile terminal according to an implementation of the present disclosure.
Figure 4:
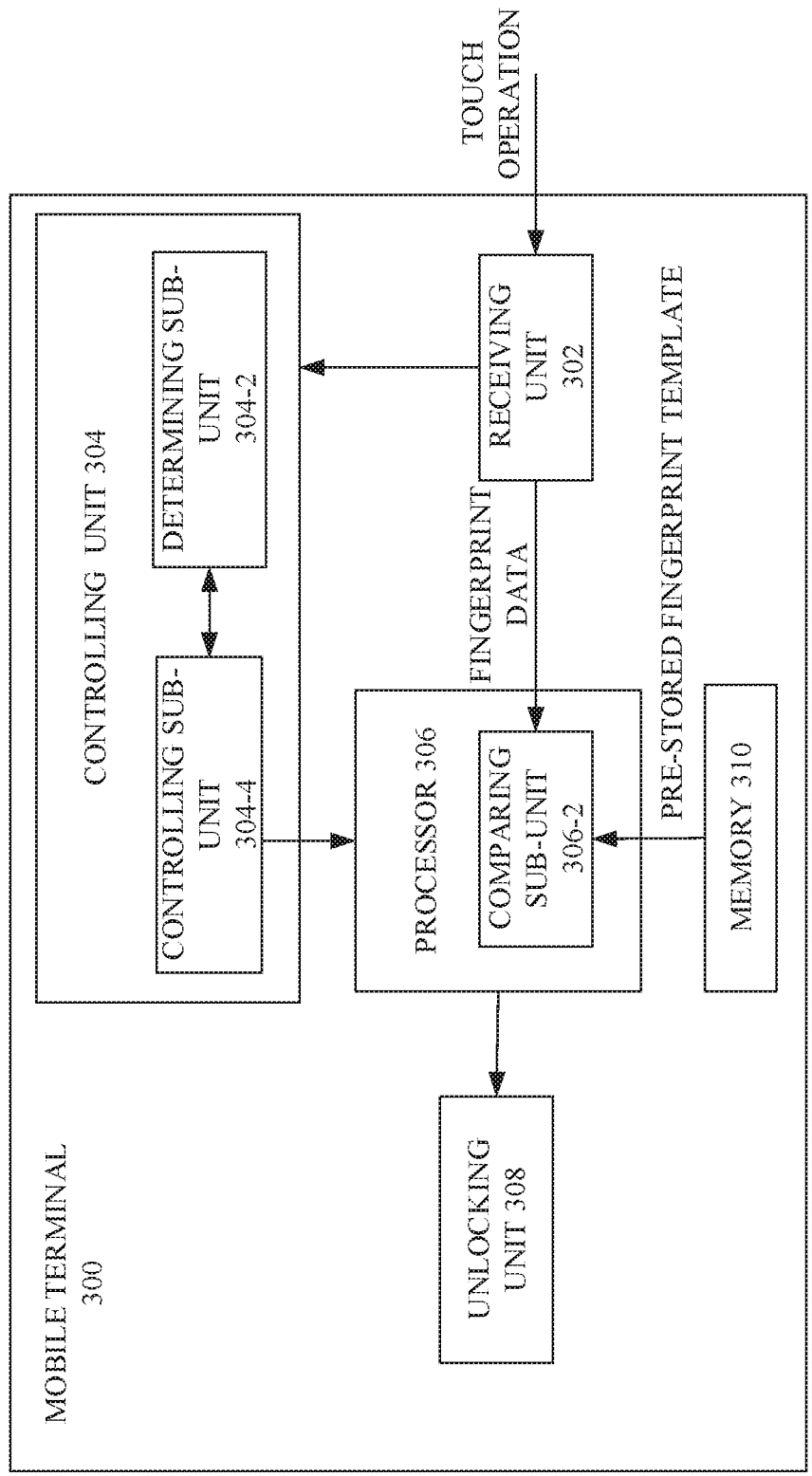
FIG. 4 is a structural block diagram illustrating a mobile terminal according to an implementation of the present disclosure.

According to an implementation of the present disclosure, there is provided a mobile terminal, which is applicable to execute the method according to the implementations of the present disclosure. FIG. 3 and FIG. 4 are block diagrams illustrating the mobile terminal according to an implementation of the present disclosure. Referring to FIG. 3, a mobile terminal 300 can include a receiving unit 302, a controlling unit 304, a processor 306, and an unlocking unit 308. The receiving unit 302, the controlling unit 304, and the unlocking unit 308 can be integrated into the processor 306 per actual needs.

The receiving unit 302 is configured to receive fingerprint data. For example, the receiving unit 302 can be integrated into a fingerprint recognition sensor of the mobile terminal. Once a touch operation on the fingerprint recognition sensor is detected, the receiving unit 302 can receive or acquire the fingerprint data.

The controlling unit 304 is configured to increase the dominant frequency of a processor. The mobile terminal may have more than one processor, the processor referred to herein be a processor configured to fingerprint data matching.

The processor 306 is configured to match the obtained fingerprint data based on the increased dominant frequency. For instance, the processor 306 can perform a fingerprint data matching process between the obtained fingerprint data and pre-stored fingerprint template data. The pre-stored fingerprint template data can be stored in a memory 310 as illustrated in FIG. 4.

The unlocking unit 308 is configured to unlock the mobile terminal when the received fingerprint data is matched.

The controlling unit 304 can increase the dominant frequency of the processor based on the highest dominant frequency of the processor. In at least one implementation, the controlling unit 304 is configured to increase the dominant frequency of the processor to the highest dominant frequency of the processor when the dominant frequency of the processor is not the highest dominant frequency. In at least one implementation, the controlling unit 304 is configured to adjust the dominant frequency of the processor to an over-clock mode when the dominant frequency is the highest dominant frequency of the processor.

In at least one implementation, as illustrated in FIG. 4, the controlling unit 304 can further include a determining sub-unit 304-2 and a controlling sub-unit 304-4.

The determining sub-unit 304-2 is configured to determine a dominant frequency increment of the processor, and the controlling sub-unit 304-4 is configured to increase the dominant frequency of the processor based on the dominant frequency increment.

In at least one implementation, the determining sub-unit 304-2 is configured to determine an amount of calculation of matching between the obtained fingerprint data and pre-stored fingerprint template data, and determine the dominant frequency increment of the processor based on the amount of calculation of matching, wherein the dominant frequency increment is positively correlated with the amount of calculation of matching.

In at least one implementation, the determining sub-unit 304-2 is configured to determine an amount of calculation of matching between the received fingerprint data and pre-stored fingerprint template data, determine a utilization rate of the processor, and determine the dominant frequency increment of the processor based on the amount of calculation of matching and the utilization rate of the processor.

The second determining unit is configured to determine a dominant frequency increment of the processor based on the amount of calculation of matching; the dominant frequency increment is positively correlated with the amount of calculation of matching.

The dominant frequency increasing unit is configured to increase the dominant frequency of the processor based on the dominant frequency increment.

In at least one implementation, the processor 306 can further include a comparing sub-unit 306-2, which is configured to compare the received fingerprint data with the pre-stored fingerprint template data to obtain a similarity score. The unlocking unit 308 is configured to unlock the mobile terminal based on the similarity score. For example, when the similarity score is greater than a preset threshold, the unlocking unit 308 can unlock the mobile terminal.

In at least one implementation, the controlling unit 304 may be further configured to reduce the dominant frequency of the processor when the data matching process is successful, that is, when the obtained fingerprint data and pre-stored fingerprint template data are matched.

It is important to note that the mobile terminal described in the implementation of the present disclosure is presented in the form of functional units. The term "unit" used herein should be understood as the widest possible meaning, and objects for implementing a described function of each "unit" may be, for example, an application specific integrated circuit (ASIC), a single circuit, a processor (shared, dedicated, or chip group) for executing one or more software or firmware programs, a memory, a combined logic circuit, and/or other proper assemblies for implementing the above-mentioned function.

Figure 5:
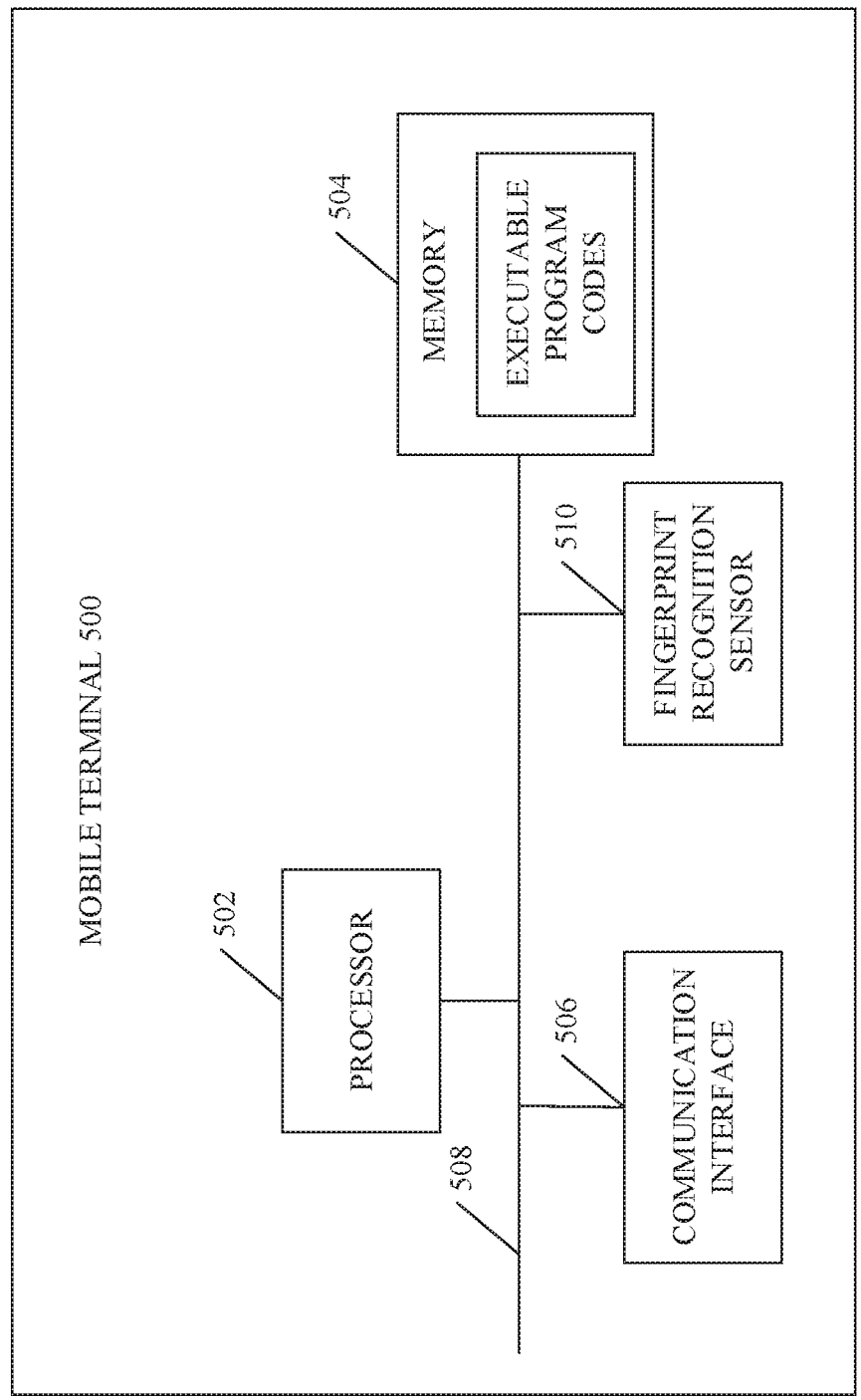
FIG. 5 is a structural schematic diagram illustrating a mobile terminal according to an implementation of the present disclosure.

For example, the function of the receiving unit 302 may be implemented by the mobile terminal as illustrated in FIG. 5. Specifically, a processor 502 can call executable program codes in a memory 504 so as to control a fingerprint recognition sensor 510 to obtain the fingerprint data.

The implementations of the present disclosure also provide another mobile terminal. As illustrated in FIG. 5, a mobile terminal 500 includes a processor 502, a memory 504, a communication interface 506, a communication bus 508, and a fingerprint recognition sensor 510; the processor 502, the memory 504, the fingerprint recognition sensor 510, and the communication interface 506 are connected via the communication bus 508 so as to achieve intercommunication. The processor 502 controls wireless communication with an external cellular network via the communication interface 506. The communication interface 506 includes but not limited to an antenna, an amplifier, a transceiver, a coupler, a low noise amplifier (LNA), a duplexer and so on. The fingerprint recognition sensor 510 is configured to obtain or receive fingerprint data. The memory 504 includes at least one of a random access memory (RAM), a non-volatile memory, and an external memory. The memory 504 is configured to store executable program codes, and the executable program codes can guide the processor 502 to execute the unlocking control method disclosed in the implementations of the present disclosure. The method can include the following operations.

The processor 502 obtains fingerprint data through the fingerprint recognition sensor 510.

The processor 502 increases the dominant frequency thereof.

The processor 502 conducts a data matching process between the obtained fingerprint data and pre-stored fingerprint template data based on the increased dominant frequency.

The processor 502 unlocks the mobile terminal when the data matching process is successful.

In implementations of the present disclosure, the mobile terminal can increase the dominant frequency of a processor after the fingerprint data is obtained and before fingerprint data matching is conducted, thereby improving the efficiency of data matching of the processor and reducing the time required for data matching between the obtained fingerprint data and pre-stored fingerprint template data, therefore, the fingerprint unlocking speed can be improved and user experience can be enhanced.

In addition, the executable program codes stored in the memory 504 can also be used for executing relevant operations of the method for controlling unlocking as illustrated in FIG. 1 and FIG. 2.

Figure 6:
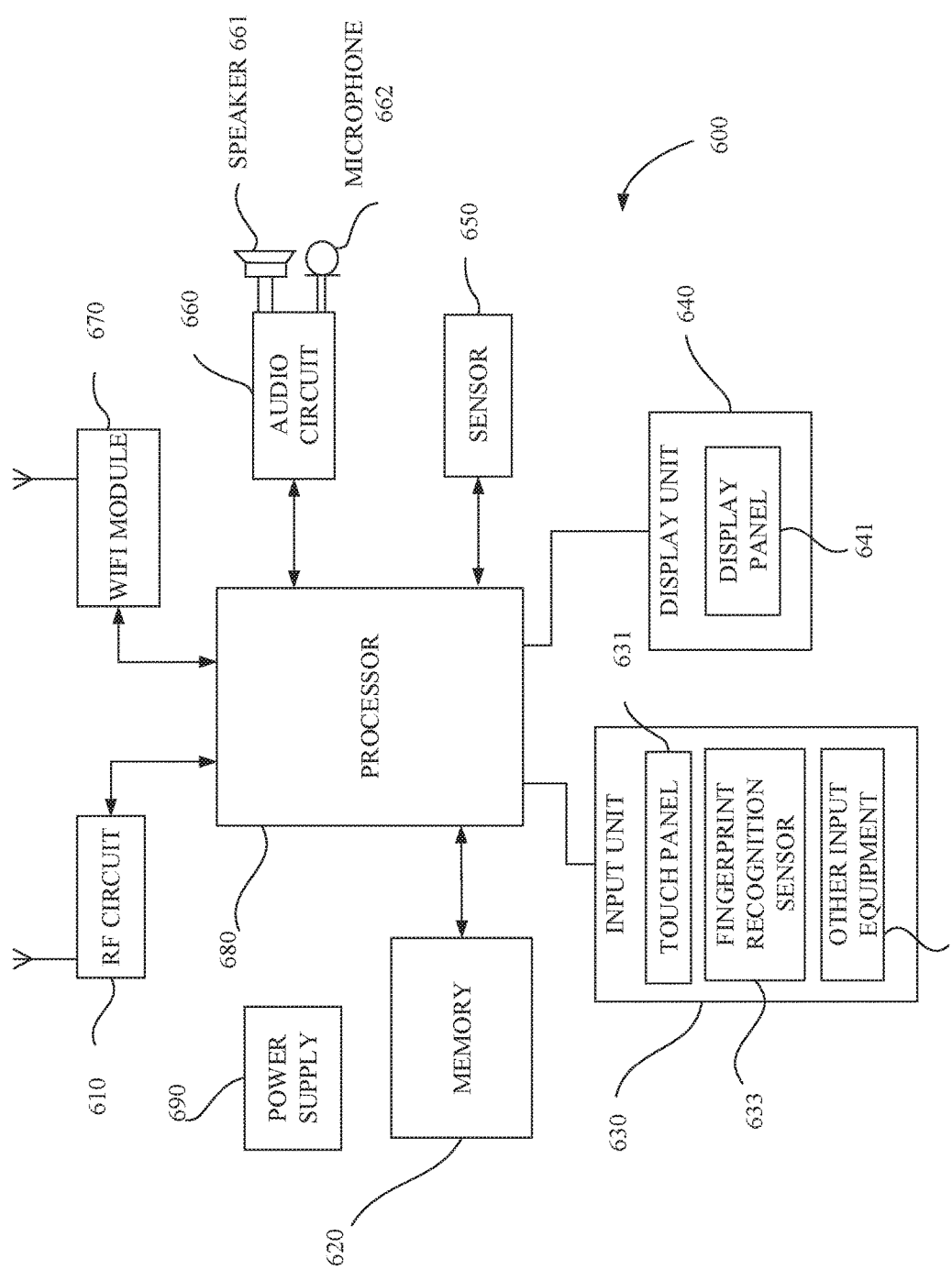
FIG. 6 is a structural schematic diagram illustrating another mobile terminal according to an implementation of the present disclosure.

The implementations of the present disclosure also provide another mobile terminal. As illustrated in FIG. 6, to facilitate illustrations, only parts relevant to the implementations of the present disclosure are illustrated. Undisclosed specific technical details may be subject to the method parts of the implementations of the present disclosure. The mobile terminal may be any terminal device including a mobile phone, a pad, a personal digital assistant (PDA), a point of sales (POS), a vehicle-mounted computer and so on. The mobile phone is adopted as the mobile terminal for example.

FIG. 6 illustrates a partial-structure diagram illustrating a mobile phone associated with a mobile terminal according to an implementation of the present disclosure. Referring to FIG. 6, the mobile phone includes: a radio frequency (RF) circuit 610, a memory 620, an input unit 630, a display unit 640, a sensor 650, an audio circuit 660, a wireless fidelity (Wi-Fi) module 670, a processor 680, a power supply 690, and other components. A person skilled in the art may understand that the mobile phone structure illustrated in FIG. 6 is not limitative to the mobile phone, and the mobile phone may include components more or fewer than those illustrated in the figure, or combine some components, or have different component arrangements.

Each component of the mobile phone will be specifically introduced below in conjunction with FIG. 6.

The RF circuit 610 may be configured to receive and transmit information. Usually, the RF circuit 610 includes, but is not limited to, an antenna, at least one amplifier, a transceiver, a coupler, a Low Noise Amplifier (LNA), a duplexer and so on. In addition, the RF circuit 610 may further communicate with other devices via wireless communication and a network. The wireless communication may use any one communication standard or protocol, including, but not limited to, Global System of Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS) and so on.

The memory 620 may be configured to store software programs and modules, and the processor 680 executes various function applications and data processing of the mobile phone by running the software programs and the modules stored in the memory 620. The memory 620 may mainly include a program storage region and a data storage region, the storage program region may store an operation system, application programs for at least one function (a power manager service (PMS) wake-up function, a fingerprint data acquisition function, a feature point matching function, and a display lighting function) and so on; and the data storage region may store data (such as fingerprint data obtained by a fingerprint recognition sensor, pre-stored preset quick unlocking period, statistical information of screen-off unlocking period and so on) created according to use of the mobile phone. In addition, the memory 620 may include a high-speed RAM, and may further include a non-volatile memory such as one of at least a disk storage device, a flash device, or other non-volatile solid storage devices.

The input unit 630 may be configured to receive input digital or character information and generate key signal input associated with user setting and functional control of the mobile phone. Specifically, the input unit 630 may includes a fingerprint recognition sensor 631 and other input devices 632. The fingerprint recognition sensor 631 may collect fingerprint data of a user thereon. Alternatively, the fingerprint recognition sensor 631 may include an optical fingerprint module, a capacitive fingerprint module, and an RF fingerprint module. By taking the capacitive fingerprint recognition sensor as the fingerprint recognition sensor 631, the fingerprint recognition sensor 631 specifically includes an induction electrode (n1 abnormal induction electrodes and n2 normal induction electrodes) and a signal processing circuit (such as amplification circuit, noise suppression circuit, and analog-to-digital conversion circuit) connected to the induction electrode. The input unit 630 may further include, in addition to the fingerprint recognition sensor 631, other input devices 632. The other input devices 632 may include, but are not limited to, one or more of a physical keyboard, a functional key (such as a volume control key and a switch key), a track ball, a mouse, and an operating rod.

The display unit 640 may be configured to display information input by the user or information provided for the user or various menus of the mobile phone. The display unit 640 may include a display screen 641, and alternatively, the display screen 641 may be configured in the form of a Liquid Crystal Display (LCD), an Organic Light-Emitting Diode (OLED) and so on. In FIG. 6, although the fingerprint recognition sensor 631 and the display screen 641 implement input output functions and of the mobile phone by serving as two independent components, the fingerprint recognition sensor 631 may be integrated with the display screen 641 to implement the input and output functions of the mobile phone in some implementations.

The mobile phone may further include at least one sensor 650 such as a light sensor, a motion sensor, and other sensors. Specifically, the light sensor may include an ambient light sensor and a proximity sensor; the ambient light sensor may adjust the luminance of the display screen 641 according to the brightness of ambient light, and the proximity sensor may close the display screen 641 and/or backlight when the mobile phone reaches nearby the ear. As a kind of motion sensor, an accelerometer sensor may detect the magnitude of an accelerated speed in each direction (generally, three-axis); when stationary, the accelerometer sensor can detect the size and direction of a gravity; the accelerometer sensor may be configured to identify an application of a mobile phone gesture (e.g., horizontal and vertical screen switching, relevant games, and magnetometer gesture calibration), and vibration recognition related functions (e.g., pedometer and knocking), and the like. Other sensors such as a gyroscope sensor, a barometer sensor, a hygrometer sensor, a thermometer sensor, an infrared sensor, and other sensors configurable for the mobile phone will not be elaborated herein.

The audio circuit 660, a loudspeaker 661, and a microphone 662 may provide an audio interface between the user and the mobile phone. The audio circuit 660 may convert received audio data to an electric signal and transmit the electric signal to the loudspeaker 661, and the loudspeaker 661 converts the electric signal into a sound signal for output. In addition, the microphone 662 converts a collected sound signal into an electric signal, the audio circuit 660 receives and converts the electric signal into audio data; the audio data is output to the processor 680 for processing and the processed audio data is transmitted to another mobile phone via the RF circuit 610, or the audio data is output to the memory 620 for further processing.

Wi-Fi belongs to a short-range wireless transmission technology, the mobile phone may assist the user in E-mail receiving and sending, webpage browsing, access to streaming media and the like by means of the Wi-Fi module 670, and it provides a wireless wideband internet access for the user. Although the Wi-Fi module 670 is illustrated in FIG. 6, it may be understood that the Wi-Fi module 670 can be optional components of the mobile phone and can totally be omitted without changing the essence of the present disclosure as required.

The processor 680 is a control center of the mobile phone, and is configured to connect all parts of the mobile phone by utilizing various interfaces and lines, to run or execute the software program and/or the module stored in the memory 620 and call data stored in the memory 620 to execute various functions and processing data of the mobile phone, so as to wholly monitor the mobile phone. Alternatively, the processor 680 may include one or more processing units. The processor 680 may be integrated with an application processor and a modulation-demodulation processor, the application processor mainly processes an operation system, a user interface, an application program and the like, and the modulation-demodulation processor mainly processes wireless communication. It should be understood that the modulation-demodulation processor may not be integrated into the processor 680.

The mobile phone may further include a power supply 690 (such as a battery) for supplying power to each component. The power supply may be connected with the processor 680 logically via a power supply management system, so as to implement functions of charging, discharging, and power consumption management by means of the power supply management system.

The mobile phone may further include a camera, a BLUETOOTH module and the like, which are not illustrated, and will not be elaborated herein.

In the foregoing implementations illustrated in FIG. 1 and FIG. 2, each step method flow may be implemented on the basis of the structure of the mobile phone.

In the foregoing implementation illustrated in FIG. 3, each unit function may be implemented on the basis of the structure of the mobile phone.

The implementations of the present disclosure also provide a computer readable storage medium. The computer readable storage medium may store one or more program, and the program can execute some or all of the steps of any unlocking control method in the method implementation.

It should be noted that, for simple description, each of the foregoing method implementations is expressed as a series of action combinations. However, it will be appreciated by those skilled in the art that, the present disclosure is not limited by a described action sequence. That is because some steps may be executed in other sequences or simultaneously according to the present disclosure. Also, it will be appreciated by those skilled in the art that, the implementations described in the description fall within exemplary implementations, and actions and modules involved may not be necessary for the present disclosure.

In the foregoing implementations, descriptions of each implementation are emphasized respectively, and parts which are not elaborated in a certain implementation may subject to relevant descriptions of other implementations.

In some implementations provided by the present application, it should be understood that the disclosed apparatus may be implemented in another manner. For example, the apparatus implementation described above is only schematic, and for example, division of the units is only logic function division, and other division manners may be adopted during practical implementation. For example, multiple units or components may be combined or integrated into another system, or some characteristics may be neglected or not executed. In addition, coupling or communication connection between each displayed or discussed component may be direct coupling or communication connection, or may be indirect coupling or communication among devices or units via some interfaces, and may be electrical and mechanical or adopt other forms.

The abovementioned units described as separate parts may or may not be physically separated, and parts displayed as units may or may not be physical units, and namely may be located in the same place, or may also be distributed to multiple network units. Part or all of the units may be selected to achieve the purpose of the solutions of the present implementation according to a practical requirement.

In addition, each function unit in each implementation of the present disclosure may be integrated into a processing unit, each unit may also exist independently, and two or more than two units may also be integrated into a unit. The abovementioned integrated unit may be implemented in a hardware form, and may also be implemented in the form of hardware and software function unit.

When being implemented in the form of software function module and sold or used as an independent product, the integrated unit may also be stored in a computer-readable storage medium. Based on such an understanding, the technical solutions of the present disclosure substantially or parts making contributions to the conventional art may be embodied in the form of software product, and the computer software product is stored in a storage medium including a plurality of instructions configured to enable a computer device (which may be a personal computer, a server, a network device or the like) to execute all or part of the method in each implementation of the present disclosure. The abovementioned memory includes: various media capable of storing program codes such as a U disk, a Read-Only Memory (ROM), an RAM, a mobile hard disk, a magnetic disk or an optical disk.

A person skilled in the art should know that: all or part of the steps of the abovementioned method implementation may be implemented by instructing related hardware through a program, the abovementioned program may be stored in a computer-readable memory; and the memory may include: a flash disk, an ROM, an RAM, a magnetic disk or an optical disk.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for controlling unlocking, comprising:
receiving fingerprint data;
increasing a dominant frequency of a processor of a mobile terminal;
matching the received fingerprint data based on the increased dominant frequency; and
unlocking the mobile terminal when the received fingerprint data is matched.

2. The method of claim 1, wherein increasing the dominant frequency of the processor of the mobile terminal comprises:
determining a dominant frequency increment of the processor; and
increasing the dominant frequency of the processor based on the dominant frequency increment.

3. The method of claim 2, wherein determining the dominant frequency increment of the processor comprises:
determining an amount of calculation of matching between the received fingerprint data and pre-stored fingerprint template data; and
determining the dominant frequency increment of the processor based on the amount of calculation of matching, wherein the dominant frequency increment is positively correlated with the amount of calculation of matching.

4. The method of claim 2, wherein determining the dominant frequency increment of the processor comprises:
determining an amount of calculation of matching between the received fingerprint data and pre-stored fingerprint template data;
determining a utilization rate of the processor; and
determining the dominant frequency increment of the processor based on the amount of calculation of matching and the utilization rate of the processor.

5. The method of claim 1, wherein matching the received fingerprint data based on the increased dominant frequency comprises:
based on the increased dominant frequency, comparing the received fingerprint data with pre-stored fingerprint template data to obtain a similarity score.

6. The method of claim 5, wherein unlocking the mobile terminal based on the similarity score comprises:
unlocking the mobile terminal when the similarity score exceeds a preset threshold.

7. The method of claim 1, further comprising:
reducing the dominant frequency of the processor in response to the unlocking of the mobile terminal.

8. A mobile terminal, comprising:
a receiving unit, configured to receive fingerprint data;
a controlling unit, configured to increase a dominant frequency of a processor;
the processor, configured to match the received fingerprint data based on the increased dominant frequency; and
an unlocking unit, configured to unlock the mobile terminal when the received fingerprint data is matched.

9. The mobile terminal of claim 8, wherein the controlling unit comprises:
a determining sub-unit, configured to determine a dominant frequency increment of the processor; and
a controlling sub-unit, configured to increase the dominant frequency of the processor based on the dominant frequency increment.

10. The mobile terminal of claim 9, wherein the determining sub-unit is configured to:

determine an amount of calculation of matching between the received fingerprint data and pre-stored fingerprint template data; and determine the dominant frequency increment of the processor based on the amount of calculation of matching, wherein the dominant frequency increment is positively correlated with the amount of calculation of matching.

11. The mobile terminal of claim 9, wherein the determining sub-unit is configured to:

determine an amount of calculation of matching between the received fingerprint data and pre-stored fingerprint template data;

determine a utilization rate of the processor; and determine the dominant frequency increment of the processor based on the amount of calculation of matching and the utilization rate of the processor.

12. The mobile terminal of claim 8, wherein the processor comprises a comparing sub-unit, which is configured to compare the received fingerprint data with pre-stored fingerprint template data to obtain a similarity score; and the unlocking unit is configured to unlock the mobile terminal based on the similarity score.

13. A method for controlling unlocking, comprising:

receiving fingerprint data upon detecting a touch operation on a fingerprint recognition sensor of a mobile terminal;

generating a fingerprint image based on the received fingerprint data;

increasing a dominant frequency of a processor of the mobile terminal;

matching the fingerprint image at the increased dominant frequency; and unlocking the mobile terminal when the fingerprint image is matched.

14. The method of claim 13, wherein increasing the dominant frequency of the processor of the mobile terminal comprises:

determining a dominant frequency increment of the processor; and increasing the dominant frequency of the processor based on the dominant frequency increment.

15. The method of claim 14, wherein determining the dominant frequency increment of the processor comprises:

determining an amount of calculation of matching between the received fingerprint data and pre-stored fingerprint template data; and determining the dominant frequency increment of the processor based on the amount of calculation of matching, wherein the dominant frequency increment is positively correlated with the amount of calculation of matching.

16. The method of claim 14, wherein determining the dominant frequency increment of the processor comprises:

determining an amount of calculation of matching between the received fingerprint data and pre-stored fingerprint template data;

determining a utilization rate of the processor; and determining the dominant frequency increment of the processor based on the amount of calculation of matching and the utilization rate of the processor.

* * * * *